A. MORAND.
AUTO SIGNAL.
APPLICATION FILED MAY 21, 1917.
1,283,263.
Patented Oct. 29, 1918.
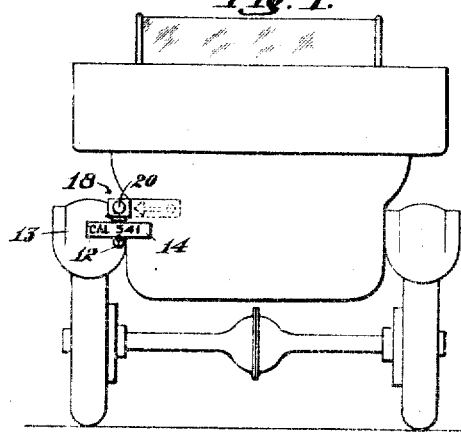
Fig. 1.
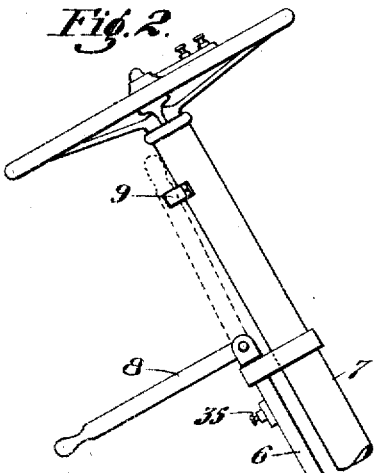
Fig. 2.
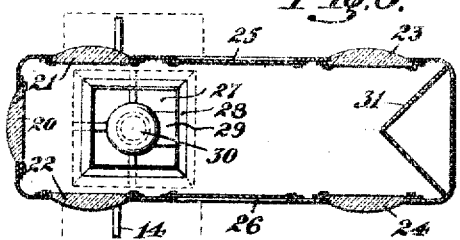
Fig. 3.
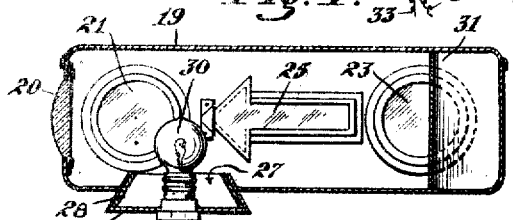
Fig. 4.
Fig. 5.
INVENTOR
Arthur Morand
BY
R. S. Berry
ATTORNEY.

UNITED STATES PATENT OFFICE.

ARTHUR MORAND, OF BAKERSFIELD, CALIFORNIA.

AUTO-SIGNAL.

1,283,263.　　　　　Specification of Letters Patent.　　Patented Oct. 29, 1918.

Application filed May 21, 1917. Serial No. 170,031.

*To all whom it may concern:*

Be it known that I, ARTHUR MORAND, a citizen of the United States, residing at Bakersfield, in the county of Kern and State of California, have invented a new and useful Auto-Signal, of which the following is a specification.

This invention relates to a direction indicator for auto-vehicles and particularly pertains to an indicator which embodies a horizontally swinging signal arm fitted with electric lights.

It is the object of this invention to provide a direction indicator of the above character which may be readily applied to various types of auto vehicles and easily actuated to denote the direction the vehicle is to be turned, and which obviates the necessity of extending the arm to designate the direction of turn.

Another object is to provide a signal arm which may also serve as a tail light and a license plate carrier, thus embodying three accessories in one attachment and thereby economizing space as well as cost.

A further object is to provide a signal arm so constructed that a single electric light therein will illuminate a tail light, direction indicating lights and also a fixed license plate irrespective of movement or position of the signal arm.

Other objects will appear hereinafter.

The invention is illustrated in the accompanying drawings, in which:

Figure 1 is a view of the rear end of an automobile showing the invention as applied.

Fig. 2 is a detail illustrating the controlling device on the vehicle steering wheel column.

Fig. 3 is a horizontal section and plan view of the signaling arm.

Fig. 4 is a view in vertical section and elevation of same.

Fig. 5 is a view in diagram illustrating the construction and arrangement of the mechanism for operating the signal arm.

In carrying out my invention, a tubular rock-shaft 6 is mounted in suitable bearings on the steering wheel column 7 of the vehicle and is fitted with a handle 8 on its upper end. This handle may be arranged convenient for engagement by the knees of the driver so that the rock shaft may be manipulated without using the hands, thus leaving the hands free for other purposes, as operating the steering wheel or other controlling mechanism of the vehicle. I have here shown the handle as pivoted to the rock-shaft so that it may be swung vertically into engagement with a clip 9 when not in use.

The lower end of the rock shaft connects through a suitable joint with a shaft 11 extending upwardly through a bracket bearing 12 mounted on the left rear fender 13 of the vehicle, which bearing is adapted to form a support for a license plate 14 by forming it with a pair of channeled lugs 15 and 16 between which the plate is insertible and engaged at its upper and lower edges. A screw 17 further secures the plate to the bracket bearing.

The essence of the present invention resides in a signal arm 18 attached to the upper end of the shaft 11, which is here shown as constructed with an oblong rectangular box-like casing provided with a removable top lid 19, the lifting of which will give access to the interior of the casing. A circular red pane 20 is mounted in one end wall of the casing and corresponding red panes 21 and 22 are arranged opposite each other in the casing side walls adjacent to the end pane 20. Circular green panes 23 and 24 are mounted in the casing side walls adjacent to the opposite end of the casing and are spaced from the red panes 21 and 22. Interposed between the side red and green panes on each side of the casing are arrow-shaped panes 25 and 26, the head portions of which point toward the red panes.

Formed in the bottom of the casing adjacent to the red panes is a rectangular opening 27 the sides of which are fitted with divergent reflector plates 28. A spider 29 connects these plates and the casing to the upper portion of the shaft 11 above the bearing 12. The shaft is thus attached to the casing to one side of the center of the latter and near one end thereof.

An electric bulb 30 is mounted on the upper end of the shaft 11 and is positioned within the casing centrally of the opening 27 and near the red panes, so that light emitted therefrom will be visible through said panes. Angular reflectors 31 are arranged back of the green panes so as to direct light rays from the bulb through the latter. Electrical conductors 32 and 33 lead from the bulb through the tubular rock shaft 11 and rod 10; the conductor 32 connecting with one terminal of a battery 34 and the conductor 33 leading to a switch 35 on the rock shaft 6 from which a conductor 36 leads to the other terminal of the battery through an indicator light bulb 37 mounted convenient to the driver. The bulb 37 is provided to indicate the condition of the electric circuit through the bulb 30, being disposed in series with the latter.

The casing is arranged on the rock shaft 11 to normally extend parallel with the fender 13 with the end red pane 20 facing rearward of the vehicle to form a tail light flanked on each side by a side light.

In the operation of the invention, to illuminate the signal arm, the switch 35 is operated to close the electric circuit through the electric bulbs, this being done as occasion may require. To signal persons in the rear, the direction in which the vehicle is to turn, the handle 8 is moved to the side to operate the signal arm through the rock shaft 6, rod 10, and rock shaft 11, to move the signal arm transverse of the fender with the arrow pointing in the desired direction. The signal arm will then extend as indicated in dotted lines in Fig. 3. After the turn has been made, the signal arm is restored to its normal position.

When the bulb 30 is illuminated, light will be directed downward by the reflectors 28 onto the license plate through the opening 27, irrespective of the position of the signal arm, as the opening and reflectors extend on three sides of the lamp, light will also pass through the tail light pane 20 and through all the side panes. By this arrangement one light will serve a triple purpose, viz., to illuminate the license plate, the tail lamp and the signal arm.

It will be observed that the device herein set forth provides a tail light, a holder for a license plate, and a direction indicator all in one structure which may be readily and cheaply attached to an automobile and easily operated.

I claim:

1. In a direction indicator, a license plate holding bracket, a shaft extending therethrough, a box-like signal arm rigid on said shaft and turnable relative to the bracket having an opening in the bottom thereof, a lamp on said shaft arranged to throw light through said opening onto a plate on the bracket, a tail light pane on the end of said arm, direction indicating panes on the sides of said arm, and means for rocking the shaft in either direction.

2. In a direction indicator, a license plate holding bracket, a shaft extending therethrough, a box-like signal arm rigid on said shaft and turnable relative to the bracket having an opening in the bottom thereof, reflector plates on the edge of said opening, a lamp arranged to throw light through said opening onto a plate on the bracket, a tail light pane on the end of said arm, direction indicating panes on the sides of said arm, and means for turning the shaft in either direction.

3. In a direction indicator for vehicles, a vertical rock shaft, a box-like signal arm rigid thereon having a bottom opening surrounding its connection to said rock-shaft, a tail light pane in one end wall of the arm, red side panes, green side panes spaced from the red panes, a lamp on the shaft arranged within the arm above the opening, and reflectors for directing light from the lamp through the green panes.

4. In a direction indicator, a tubular bracket, a license plate thereon, a shaft extending vertically through said bracket, a box-like signal arm attached intermediate its ends to said shaft to turn horizontally relative to said bracket, having an opening in the bottom thereof, and a lamp on said shaft, within the arm arranged to throw light downwardly through the opening onto the license plate.

5. In a direction indicator, a tubular bracket, a license plate thereon, a shaft extending through said bracket, a spider fixed on said shaft above the bracket, a box-like signal arm rigidly attached to said spider, and having a bottom opening spanned by the spider, and a lamp on said shaft arranged to throw light downwardly through the opening onto the license plate.

ARTHUR MORAND.